United States Patent [19]

Hansen

[11] Patent Number: 4,812,188

[45] Date of Patent: Mar. 14, 1989

[54] METHOD FOR PRODUCING COVERING PLATE MEMBERS FOR DOOR OR PANEL ELEMENTS

[76] Inventor: Hardy V. Hansen, Vangsgade 14, DK-6870 Ölgod, Denmark

[21] Appl. No.: 67,304

[22] PCT Filed: Oct. 10, 1986

[86] PCT No.: PCT/DK86/00114

§ 371 Date: Jun. 10, 1987

§ 102(e) Date: Jun. 10, 1987

[87] PCT Pub. No.: WO87/02407

PCT Pub. Date: Apr. 23, 1987

[30] Foreign Application Priority Data

Oct. 10, 1985 [DK] Denmark ........................ 4630/85

[51] Int. Cl.$^4$ .................................... B32B 31/20

[52] U.S. Cl. .................................... 156/220; 52/455; 156/245; 156/292; 264/119

[58] Field of Search .................... 52/455; 156/219, 220, 156/245, 292; 162/11; 264/119

[56] References Cited

U.S. PATENT DOCUMENTS

| | | | |
|---|---|---|---|
| Re. 26,376 | 4/1968 | Caron et al. | 264/119 |
| 2,120,137 | 6/1938 | Mason | 162/11 |
| 2,682,083 | 6/1954 | Patton | 264/119 |
| 4,265,067 | 5/1981 | Palmer | 52/455 X |

*Primary Examiner*—Robert A. Dawson

*Attorney, Agent, or Firm*—Antonelli, Terry & Wands

[57] ABSTRACT

To produce doors or other panel elements within the appearance of an infilled panel type, the panelling pattern is achieved through a simple relief pressing of a thin covering plate member which is mounted on a carrier frame work. The covering plate member, coated by a veneer or paper, is produced from wood fiber or a chip mass which is pressed and heated only to the extent that the plate material becomes leather-like, that is, without the incorporated binding agent being hardened. By the relief pressing of the covering plate, heat is supplied in such a manner that the binding agent hardens after the final deformation pressure has been applied, whereby a stable final product is obtained in a simple and inexpensive manner.

11 Claims, 1 Drawing Sheet

METHOD FOR PRODUCING COVERING PLATE MEMBERS FOR DOOR OR PANEL ELEMENTS

BACKGROUND OF THE INVENTION

The present invention relates to a method of producing imitated panelled doors and similar panelling elements, which appear with a frame portion and a front surface plane, and one or more partial area portions with recessed surface planes. In the old prior art such panelling element consisted of a frame of joined board portions forming one or more openings in which were inserted infilling panels, the edge portions of these as well as optionally the adjacent edges of the frame board portions being profiled for forming characteristic subframe patterns. The other sides of the infilling panels may well be flush with the outer sides of the frame portion, but in the transition areas along the edges of the panels the outer side will be recessed compared to the plane of the outer side of the frame portion.

In recent times many attempts have been made to produce such doors, furniture doors, or panelled elements with such as appearance, but by using a modernized technique whereby e.g. the frame boards are replaced by a continuous body of chipboard or similar materials. It has even been proposed that both the frame and the panel portions can be glued as separate covering elements onto a through-going base plate member. Truly it is hereby possible to provide imitated panelled doors or panel elements substantially cheaper than by the original method, but still substantial production costs have been involved relative to the modern alternative which consists of the so-called smooth doors. However, the decorative effect of a "panelled door" is so pronounced that it justifies a somewhat higher production price than for a simple smooth door.

It is the purpose of the invention to provide a method by which a door or panel element can be produced as an imitated element of the panelled type in a very inexpensive manner.

The invention is based on the consideration that the infilling panels or at least the characteristic border portions between these and the surrounding frame portion may very well be produced by a simple die pressing of an originally planar plate member when this is adapted to resist the die pressing without the occurring of visually unacceptable deformations in the surface of the plate manner. On the other hand, this condition is highly essential in practice, and the problem is that an acceptable surface made from either a wooden veneer or paper suitable for painting is difficult to shape by die pressing. It is possible that the very idea of a pattern embossing is not new, as e.g. a chip board is locally compressible, but prior attempts in this direction have not lead to practically usable results.

By the invention a method is developed by which the panelling element is constructed in a manner known per se by covering a frame structure with a relatively thin cover plate, but whereby it has been found possible to die press such a cover plate, which is specially produced for the purpose for obtaining an outer surface appearance which perfectly corresponds to the said panelling pattern. It is hereby essential that the thin plate member can be die pressed while being coated by veneer or paper and that the plate therefore, may be a wood-like character so that it does not later show warping tendencies.

In accordance with the present invention, a method of producing door or other panel elements having a relief surface is provided by a combination of construction the elements as a frame work which is provided with wood-like thin covering plates with the covering plates being utilized with an associated paper or veneer coatings which have been subjected to a previous die pressing for forming a relief surface.

However, it has been found that by using already known thin plate materials it is very difficult to obtain satisfying results, and on this background the invention also provides for a new plate material, adapted to the purpose or, more correctly, a method of producing such covering plate members based on such a pre-fabricated plate material.

In order to produce the above described plate covering members based on a prefabricated plate material, in accordance with advantageous features of the present inventions, a prefabricated thin leather-like plate member is coated with a paper or veneer, with the plate member including an only slightly pressed wood fiber or wood chip mass with a content of only partially activated heat-setting binding agent, whereafter, the thus coated plate member is subjected to a non-abrupt pressing between fully covering die pressing plates embodied with a desired matrix-patrix pattern, and with heat being supplied to the plate member during the pressing in such a manner, that the binding agent in the plate member as well as in the binding layer for the paper, a veneer coating is brought to a final setting subsequent to the establishing of a final pressing pressure, by which the relief pressing is completed and the plate member generally has been substantially compacted.

By virtue of the above noted features of the present invention, a plate material having a leather-like character is practically completely unusable until it is finished by the pressing and heating process. On the other hand, the plate material is willingly deformable by the die pressing because of the built-in binding agent is not finally activated until the pressing operating is finished, but nevertheless in direct connection herewith.

It has been found that by using a veneer coating on such a plate material it is obtainable that also the veneer is deformable for forming the desired relief pattern without cracking, which obviously is a practical prerequisite for the practical utility of the invention. It is hereby necessary that the veneer be subject to a steaming immediately before the pressing so as to be suitably deformable, and it is even a requirement that the veneer is fastened to the plate member by means of a glue, which just as the binding agent in the plate member, is not finally activated until a relatively high final temperature is reached after the pressing process has been finished.

In the following the invention is described in more detail with reference to the drawing.

DETAILED DESCRIPTION

Figure 1:
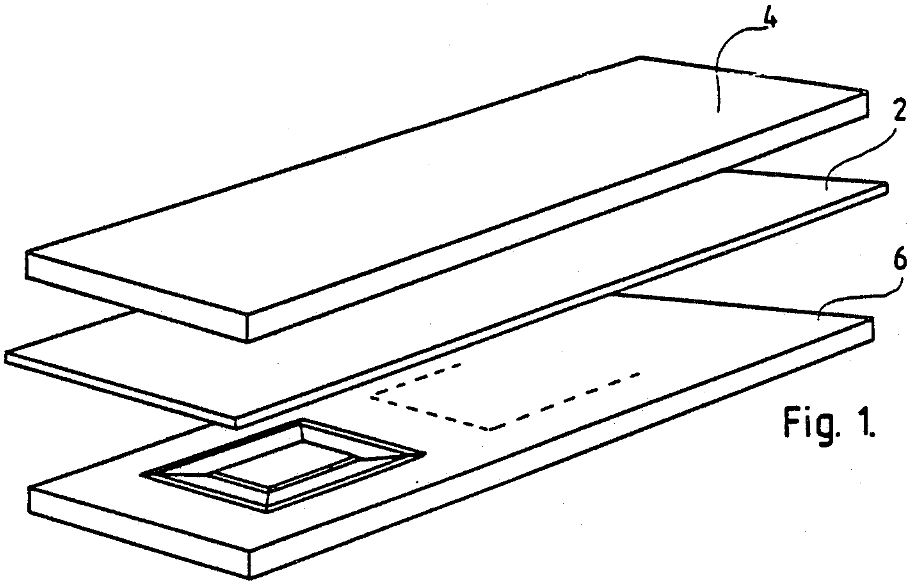
FIG. 1 is an exploded perspecive view of a plate member before pressing between relief-forming die pressing plates.
Figure 3:
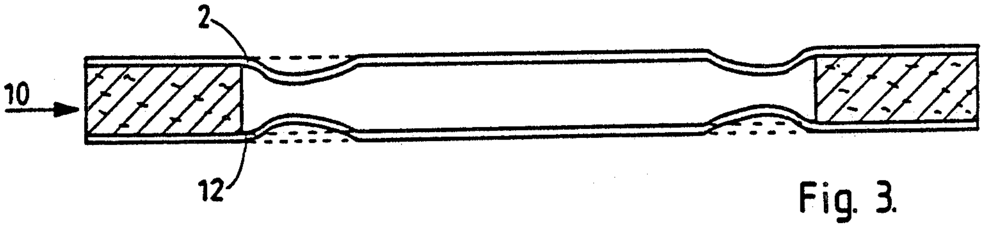
FIG. 3 is a cross sectional view of a panel element.

In FIG. 1 is indicated a plate member 2 placed between two die pressing plates 4 and 6 embodied as matrix and patrix, respectively, for the pressing of the plate 2, with a pattern similar to elements of the infilling panel type. After the pressing, which is described in more detail below, the plate member is used as a cover plate member on a frame work 10, FIG. 3, a corresponding or optionally a planar plate member 12 being placed on the other side of the framework, whereby a door, a furniture door or other panel element is obtained, which at least on its front side appears with the particular panel pattern.

Figure 2:
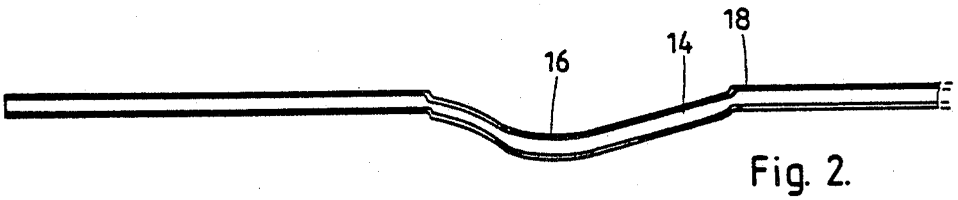
FIG. 2 is a cross sectional view of the pressed plate member.

The plate member 2, as indicated in FIG. 2, includes a base plate member 14 having a coating 16 of veneer or paper or both sides. These coating layers are secured to the base plate by so-called glue or adhesive sheet 18, which are activated and set in a known manner by heating. By the mounting of the coating layers, however, only so much heat is supplied that the sheets bind moderately without being cured.

The base plate 14 is a special product which will only exceptionally be suitable for other purposes. The plate member is produced as an only slightly compressed element of wood fibre mass or chip mass, e.g. either a very thin chip board or a plate member of the Masonite type, which at the production is pressed to a bulk density of 400–600 $kg/m^3$, preferably 500 $kg/m^3$, while usual chip boards or Masonite plates have a bulk density of 700–800 $kg/m^3$. Moreover, the plate member is produced with a low degree of heat supply, so that the binding agent in the material, consisting of a heat setting glue, such as a urea or phenol give only partially activated and thus not cured. The result is that the base plate member 14, at least before the veneering, appears as a leather-like bendable plate member. It is somewhat stiffened by the veneering, but still without being hardened. Its thickess can be of appx. 3–4 mm, while the coating layers 16 should not be thicker than apprx. 0,8 mm, e.g. a 0,6 mm veneer.

Before the pressing the veneer layers are smoothened, and immediately before the pressing they are steamed for some 30 seconds at 100° C.

The pressing takes place with a gradual build up of a pressing pressure of appx. 20 $kg/cm^2$ during appx. 2 minutes. Simultaneously, care is taken to heat the plate, through the pressing plates 4 and 6 formed of e.g. aluminium, such that a temperature of some 130° C. or another setting temperature for the binding agents will be achieved sufficiently late for the binding agents not to harden until after the building of the final, pressing pressure, e.g. not until some 30 seconds thereafter, whereby it is ensured that the deformation of the plate is fully accomplished while it is still deformable.

By the pressing the base plate member 14 is generally compressed 10–20%, preferably 12–15%.

Under the above conditions it is quite possible to press a depress relief patterns with a height or depth of at least 6–7 mm, without a normal wooden veneer tending to burst, and when the binding agent in both the base plate member 14 and the glue sheets or films 18 is cured by the final heating a very strong final product is obtained, which will be further strengthened by the produced relief pressing.

It should be noticed that the necessary smoothening of the applied veneer layer a layers 16 might well take place after the pressing, i.e. on the finished plate product, but for one thing, no tools exist for smoothening relief embossed veneer, and for another thing, it proves fully sufficient to plane smoothen the veneer in a usual manner before the steaming and the pressing, inasfar as the veneer, after the pressing, will show a surface which is fully ready for use.

I claim:

1. A method for producing doors or other panel elements having a relief surface comprising the steps of: providing a prefabricated, thin plate member including an only slightly pressed wood fiber or wood chip mass with a content of only partially activated heat-setting binding agent, coating the plate member with paper or veneer, subjecting the thus coated plate member to a non-abrupt pressing between fully covering die pressing plates having a desired matrix-patrix pattern, supplying heat to the plate member during the non-abrupt pressing in such a manner that the binding agent in the plate member as well as in a binding layer for the paper or veneer coating is brought to a final setting subsequent to establishing a final pressing pressure, by which the relief pressing is completed and the plate member generally has been substantially compacted.

2. A method according to claim 1, characterized in that a plate member of wood fibre or chip mass has a bulk density of 400–600 $kg/m^3$ and an original thickness of max. 4 mm is used.

3. A method according to claim 1 or 2, characterized in that, during the pressing the plate member is compacted 10–20%.

4. A method according to claim 1, characterized in that the fully covering die pressing plates are pressed together for a final pressure of the magnitude 15-25 $kp/m^2$ during the pressing time of at least $\frac{1}{2}$ minute and that the heat supply is regulated in such a manner that a final setting temperature of the binding agent is achieved subsequent to the final pressing pressure being established, at 120° C.–140° C. approximately 30 seconds thereafter.

5. A method according to claim 1, characterized in that the surface of a veneer coated plate member is smoothened before the pressing, and is steamed immediately before the pressing, for preferably 15–30 seconds at 100° C.

6. A method according to claim 2, wherein said prefabricated, thin plate member is leather-like before said step of supplying heat.

7. A method according to claim 2, further comprising the step of joining the pressed and heated plate member to a frame work.

8. A method according to claim 2, further comprising the step of joining a pair of the pressed and heated plate members in the form of surfaces of a panelled door to a door frame work to form a door.

9. A method according to claim 2, characterized in that said original thickness is a max. of 3.2 mm.

10. A method according to claim 3, characterized in that said plate members are compacted 12–15%.

11. A method according to claim 4, characterized in that said pressing time is 1–3 minutes.

* * * * *